United States Patent Office 3,795,596
Patented Mar. 5, 1974

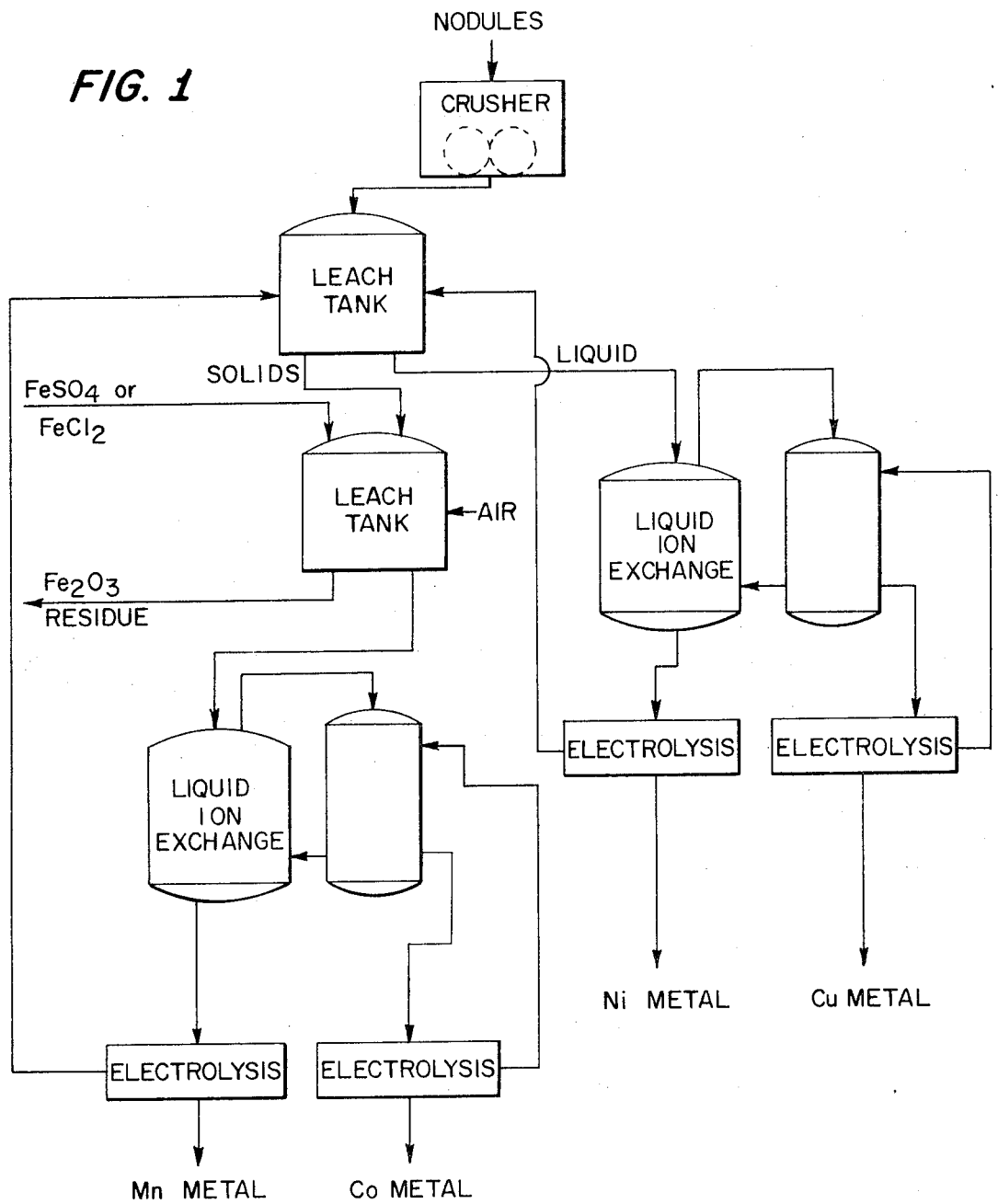

3,795,596
METHOD FOR SELECTIVELY LEACHING METAL VALUES FROM OCEAN FLOOR NODULES
William S. Kane, Newport News, and Paul H. Cardwell, Zanoni, Va., assignors to Deepsea Ventures, Inc., Gloucester Point, Va.
Continuation of application Ser. No. 40,585, May 26, 1970. This application July 17, 1972, Ser. No. 272,226
Int. Cl. C22d 1/14, 1/24
U.S. Cl. 204—105 M         9 Claims

ABSTRACT OF THE DISCLOSURE

Method for recovering metal values from ocean floor nodules of the type containing iron, manganese, copper, cobalt and nickel comprising grinding the nodules into particles, subjecting the ground nodules to a first leaching step which dissolves copper and nickel, after which the solids are separated, then subjecting the leach liquor to liquid ion exchange and electrolyzing so as to obtain copper and nickel values.

Subjecting the solids to a second leach, using ferrous sulfate or ferrous chloride, removing the iron oxide and subjecting the solids to a liquid ion exchange for separating cobalt and manganese and then electrolyzing to recover independently the cobalt and manganese values.

CROSS REFERENCES TO RELATED APPLICATIONS

This is a continuation of applicants' Method for Selectively Leaching Metal Values From Ocean Nodules.

BACKGROUND OF THE INVENTION

Field of the invention

A great deal of recent attention has been directed to the harvesting of ocean floor nodules and extraction of their principal metal values including manganese, copper, cobalt, and nickel. Earlier inventors have attempted removal of one or more of these metal values but, apparently, have been unable to isolate and remove selectively the manganese, copper, cobalt, and nickel values. Also, industries have hydrochlorinated ores so as to remove nickel, cobalt and manganese. However, these processes have been mostly restricted to removal of one or, at the most, two of these metals, the raffinate or residue solution having been discarded as waste.

Description of the prior art

The single pertinent prior patent is Mero, 3,169,856, which is limited to treating nodules in which all the nickel is present in the manganese oxide phase and all of the cobalt is present in the iron phase. Practice of the method depends upon the solubility of the copper and nickel in sulfuric acid in conjunction with the slow or insolubility of cobalt and manganese. Once the copper and nickel are dissolved, the cobalt and manganese can be dissolved using ferrous sulfate.

SUMMARY OF THE INVENTION

According to the present invention, pickle liquor, such as ferrous sulfate and ferrous chloride are used as a reducing chemical to dissolve cobalt and magnanese prior to a liquid ion exchange process. The method is thus suggested for use in the environs of a steel making plant.

BRIEF DESCRIPTION OF THE DRAWINGS

The single sheet of drawings is a schematic flow sheet depicting the pickle liquor leach process.

DESCRIPTION OF THE PREFERRED EMBODIMENTS

Applicants have determined that if the nodules are leached with the anolyte from the manganese aqueous electrolytic cell and the anolyte from the nickel aqueous electrolytic cell—both anolytes contain 4% sulfuric acid and 10% ammonium sulfate-copper and nickel are extracted. Only small amounts of cobalt and manganese are dissolved.

The cobalt and manganese can be dissolved by the use of a reducing chemical such as ferrous sulfate, ferric chloride, sulfur dioxide, sulfurous acid or hydrogen chloride. Applicants prefer to use the ferrous salts. These two materials are waste products from acid pickle steel operations. Ferrous sulfate when sulfuric acid is used and ferrous chloride when hydrochloric acid is used.

Example 1

Using 31 grams of nodules containing 17.6% manganese, 11.6% iron, 0.61% nickel, 0.32% cobalt and 0.10% copper of less than 100 mesh particles treated in three stages each at 82° C., the following results were obtained.

| Treatment | Percentage dissolved | | | |
|---|---|---|---|---|
|  | Manganese | Nickel | Cobalt | Copper |
| 1st stage, 500 mls. 4% $H_2SO_4$ for 14 hours | 4.5 | 74.8 | 12.8 | 77.1 |
| 2d stage, 500 mls. of ferrous sulfate solution (57 grams $FeSO_4 \cdot 7H_2O$) for 2 hours | 57.7 | 4.8 | 50 | Trace |
| 3d stage, 500 mls. of ferrous sulfate solution (57 grams $FeSO_4 \cdot 7H_2O$) for 2 hours | 28.9 | 4.2 | 24.5 | 3.5 |

The sulfuric acid solution usually used to leach the nodules is the anolyte from the manganese aqueous electrolytic cell. The nickel anolyte from the aqueous nickel electrolytic cell can also be used and at times is used. Both of these anolytes contain 4% sulfuric acid and 10% ammonium sulfate. The leaching can be done at ambient temperatures but we prefer a hot leach of up to 80° C.

Usually the anolytes contain traces of their respective metals namely manganese and nickel. When manganese is present a modification of the process has to be made. This will be described later.

Following the leaching with the anolyte for dissolving the copper and nickel, a liquid solid separation is made. The solids proceed to the leaching with a reducing chemical. The liquid is subjected to liquid ion exchange using LIX-64N in which copper is extracted by the organic solution of LIX-64N. The organic solution now containing copper is stripped of the copper using the anolyte from the copper aqueous electrolytic cell operation. Other ion exchange reagents than LIX-64N can be used such as Kelex, LIX-63 and 64.

The raffinate from the copper extraction contains nickel and manganese if the manganese anolyte used for leaching contains manganese. If manganese is present, the nickel must be separated and this is accomplished using Kelex liquid ion exchange at a pH of 4.2. This results in the nickel being in the organic solution from which it is stripped using the nickel anolyte from the aqueous nickel electrolytic cell. If manganese is not present there is no need for liquid ion exchange operation using Kelex and the nickel anolyte is used for leaching of the nodules along with the manganese anolyte.

The raffinate from the nickel and manganese separation (providing there is a separation to be made) contains manganese which is fed to the manganese aqueous electrolytic cell.

The solids from the leaching of the nodules with the manganese anolyte, are releached this time with a solution of ferrous sulfate. This dissolves the cobalt and manganese. After oxidization with air or oxygen to precipitate iron oxide and removing the solids (iron oxide and insoluble residue) the pregnant leach liquor is subjected to a liquid ion exchange operation using Kelex at a pH of 4.2. The cobalt is extracted into the organic phase from which it is stripped using the anolyte from the cobalt aqueous electrolytic cell.

The raffinate from this liquid ion exchange operation contains manganese which becomes the feed to the aqueous manganese electrolytic cell. If there are impurities in this manganese stream they are removed by sulfide precipitation prior to feeding the stream to the electrolytic cell.

We claim:
1. Method of selective leaching of metal values from ocean floor nodules comprising:
   (A) comminuting said nodules;
   (B) leaching said nodules with sulfuric acid so as to dissolve the copper and nickel in a leach liquor, and separating solids therefrom;
   (C) subjecting said liquor to successive liquor ion exchange steps, so as to extract independenttly the desired copper and nickel metal values, stripping separately and cathodically electroplating to recover the desired metal values;
   (D) releaching said solids with an aqueous solution of ferrous sulfate, so as to dissolve cobalt and manganese in a releach liquor;
   (E) flowing air, so as to precipitate iron oxide, then removing iron oxide and residue solids, so as to leave a pregnant releach liquor;
   (F) subjecting said releach liquor to a liquid ion exchange reagent, so as to extract cobalt values, leaving a raffinate containing manganese, stripping said cobalt, and
   (G) separately cathodically electroplating to recover said cobalt and manganese values.

2. Method for selective leaching of metal values from ocean floor nodules containing copper, nickel, cobalt, manganese and iron, the method comprising:
   (A) leaching said nodules with sulfuric acid leach liquor so as to dissolve the copper and nickel in a leach liquor, and separating solids therefrom;
   (B) subjecting said liquor to successive liquid ion exchange steps, so as to extract independently the desired copper and nickel metal values to form separate solutions of copper and nickel values;
   (C) releaching said solids with an aqueous solution of a reducing agent so as to dissolve cobalt and manganese in a releach liquor;
   (D) oxygenating the releach liquor so as to precipitate iron oxide;
   (E) separating residue solids and iron oxide, so as to leave a pregnant releach liquor;
   (F) subjecting said releach liquor to a liquid ion exchange reagent, so as to separate cobalt values from manganese values and form separate solutions of cobalt and manganese values.

3. The method of claim 2 wherein the reducing agent is selected from the groups consisting of ferrous sulfate, ferrous chloride, sulfur dioxide, sulfurous acid or hydrogen chloride.

4. The method of claim 2 wherein each of the separated metal values is cathodically electroplated to recover the respective elemental metal values.

5. The method of claim 2 wherein the sulfuric acid leach liquor is the anolyte from a manganese aqueous electrolytic cell or a cobalt aqueous electrolytic cell.

6. The method of claim 4 wherein the separated solution containing the manganese value is further purified prior to electroplating by removal of impurities by sulfide precipitation.

7. The method of claim 2 wherein the releach liquor is maintained at pH 4 to 7 during the separation of manganese and cobalt values by liquid ion exchange, and wherein the separation is obtained by extracting cobalt values and leaving a raffinate containing manganese.

8. The method of claim 7 wherein the cobalt values are stripped from the liquid ion exchange reagent by an anolyte liquid from a cobalt aqueous electrolytic cell.

9. Method for selective leaching of metal values from ocean floor nodules comprising:
   (A) comminuting said nodules;
   (B) leaching said nodules with an anolyte liquid containing sulfuric acid from a manganese aqueous electrolytic cell and an anolyte liquid from a nickel aqueous electrolytic cell at a temperature of approximately 80° C., so as to obtain nickel and copper in a liquid solution, then separating solids therefrom;
   (C) subjecting the liquid to liquid ion exchange by means of an organic solution so as to extract copper;
   (D) stripping said copper by means of an anolyte liquid from a copper aqueous electrolytic cell operation;
   (E) cathodically electroplating to remove copper;
   (F) subjecting the raffinate from the copper extraction to liquid ion exchange so as to extract nickel;
   (G) stripping said nickel from said nickel solution by means of an anolyte liquid from a nickel aqueous electrolytic cell, and cathodically electroplating to recover nickel values;
   (H) releaching the solids with an aqueous solution of ferrous sulfate, so as to dissolve cobalt and manganese;
   (I) flowing air into said releaching liquid, so as to precipitate iron oxide, and removing iron oxide and residue solids so as to leave a pregnant leach liquor;
   (J) subjecting said pregnant leach liquor to a liquid ion exchange operation, so as to extract cobalt in the organic phase from which it is stripped by means of the anolyte liquid from a cobalt aqueous electrolytic cell;
   (K) cathodically electroplating to recover cobalt values;
   (L) feeding the raffinate from the liquid ion exchange operation containing manganese to an aqueous manganese electrolytic cell and cathodically electroplating, so as to recover manganese metal values.

References Cited
UNITED STATES PATENTS 3,402,042   9/1968   Lichty _____ 75—101 BE
3,380,801   4/1968   Williams et al. ____ 75—101 BE JOHN H. MACK, Primary Examiner R. L. ANDREWS, Assistant Examiner U.S. Cl. X.R.

75—101 BE, 115, 117, 119, 121, 108; 204—109, 112; 423—633, 140